S. O. Blanding,

Sifter.

No. 110,543. Patented Dec. 27, 1870.

Witnesses.
Phil. R. Larner
Frank A. Jackson

Inventor.
Sanford O. Blanding
By Wm. C. Wood
Attorney.

United States Patent Office.

SANFORD O. BLANDING, OF VINELAND, NEW JERSEY.

Letters Patent No. 110,543, dated December 27, 1870.

IMPROVEMENT IN SIFTERS.

The Schedule referred to in these Letters Patent and making part of the same.

*To all whom it may concern:*

Be it known that I, SANFORD O. BLANDING, of the town of Vineland, county of Cumberland and State of New Jersey, have invented a certain new and useful Improvement in Sifters for general domestic uses.

My invention consists in a novel combination of an exterior case and barrel-cover with a handled sieve, and also in the details of construction, by all of which a practically operative and economical device is produced; and I do hereby declare that the following specification, taking in connection with drawing furnished and forming a part of the same, is a true, clear, and exact description thereof.

Reference being had to the drawing—

A represents the exterior case. It has a cover hinged at one of its sides to the wall of the case.

B represents a circular head, on which the case A is mounted.

The head is provided with a flange, b, projecting downward. This head is, in fact, the usual barrel-cover, with a square opening therein corresponding with the interior of the case A.

C is the sieve, made in the usual form, provided with a handle, c, attached to one of its ends.

D is one of two pivoted legs attached to the outer sides of the sieve.

These legs are connected by a cross-bar, d, beneath the sieve.

E is one of two beater-plates placed with relation to the pivoted legs and cross-bar d, on the under edge of each side of the sieve, so that when the sieve is rocked longitudinally upon the pivoted legs the cross-bar d shall come in contact with the curved ends of the beater-plates.

F represents one of two bearings, which are attached vertically to the inner surface of each side of the case A. They may be described as U-shaped bands, having flaring sides.

When placed in position, the legs D of the sieve rest upon the lower portion of the bearings F. When moved backward and forward there is no friction between any of the parts. A vertical "chucking" movement is effected by the striking of the cross-bar d against the beater-plates, and the operation of sifting is rapidly effected.

It is sometimes desirable that the sieve be used separate from the case and the barrel-head, and then it can as well be operated upon the ground as in the case.

By using it in connection with the barrel for sifting ashes or meal, no dust arises to inconvenience the operator.

So little longitudinal space is possible, if a sieve be combined with the cover, that any of the ordinary sliding sieves cannot well be operated. Owing to the vertical chucking of my improved sieve but slight longitudinal movement is requisite.

Figure 1:
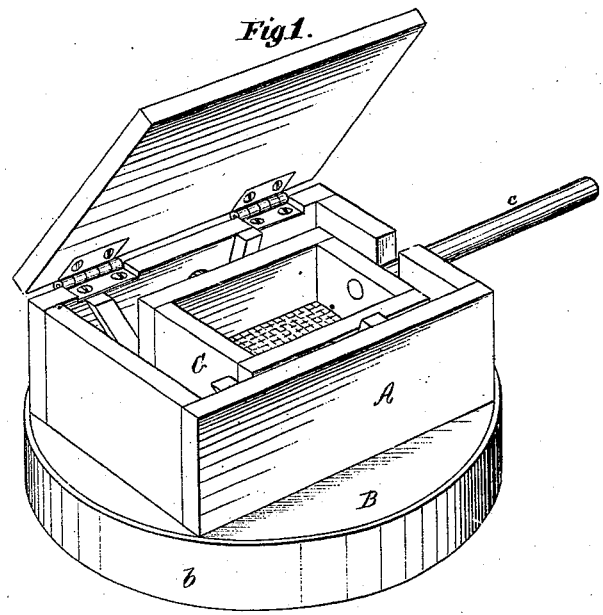
Figure 1 represents one of my improved sifters in perspective.
Figure 2:
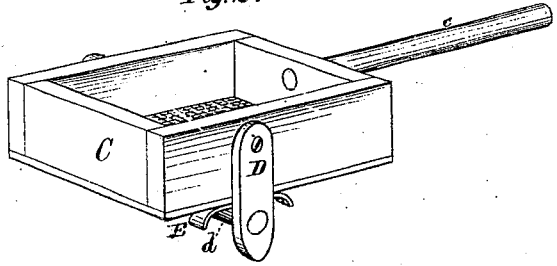
Figure 2 represents the handled sieve detached.
Figure 3:
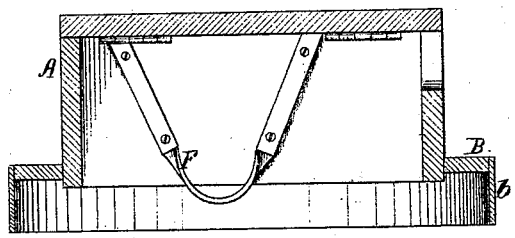
Figure 3 represents the interior of one of the sides of the exterior case, for the purpose of exhibiting the bearings on which the sieve is sustained and operated.

In the Letters Patent granted me March 1, 1870, I exhibit and describe a sieve substantially like that shown in fig. 2, the only addition being in the addition of the beater-plates.

When constructed without them, I discovered that continued use so wore away the bottom edge of the sieve, that after a while the cross-bar would wedge or bind, so as to require much additional effort to operate the sieve.

A plain plate was then proposed, but it was found that its tendency was to strain the several parts and render them liable to speedy wear. The curved ends were then added, so that the blow is received from the cross-bar before it can come in contact with the bottom edge of the sieve, and it has proven of great practical value.

It is evident that the legs D may be connected or not, as may be desired, for operation within the case, as the bearings F will always serve to keep them in proper relative position. For use, however, out of the case, the legs will operate better if connected.

Should they be mounted at their upper ends upon a cross-bar extending across the sieve, it will only be requisite that the bearings F have lateral projections for coming in contact with the edges of the legs.

Having thus described my invention,

I claim as new and desire to secure by Letters Patent—

1. The cover B, case A, and pivoted handled sieve C, in combination, constructed and operating substantially as described.

2. In combination with the handled sieve C and pivoted legs D, the beater-plates E, with curved ends, constructed and operating substantially as described.

SANFORD O. BLANDING.

Witnesses:
W. M. GWYNNETH,
JOHN L. BURK.